April 15, 1958 G. SCHNEIDER 2,830,676
SHAKER MECHANISM FOR FILTER BAGS
Filed Jan. 19, 1956 4 Sheets-Sheet 1

INVENTOR
George Schneider
BY Evans & Pearne
ATTORNEYS

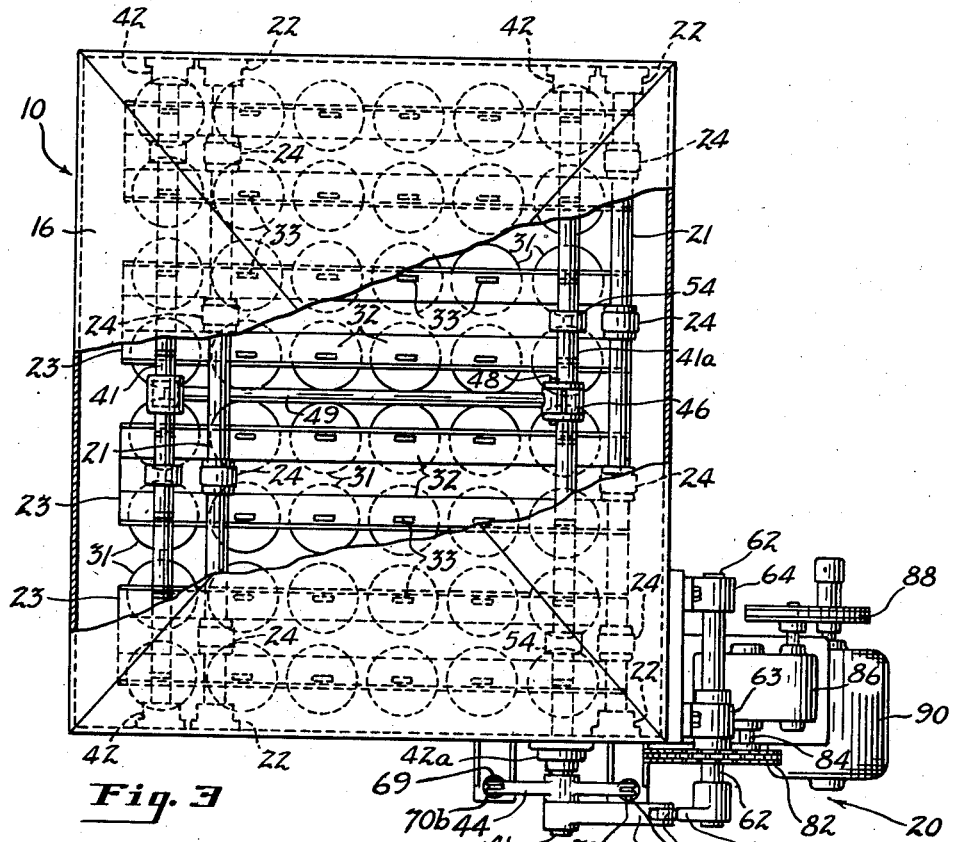
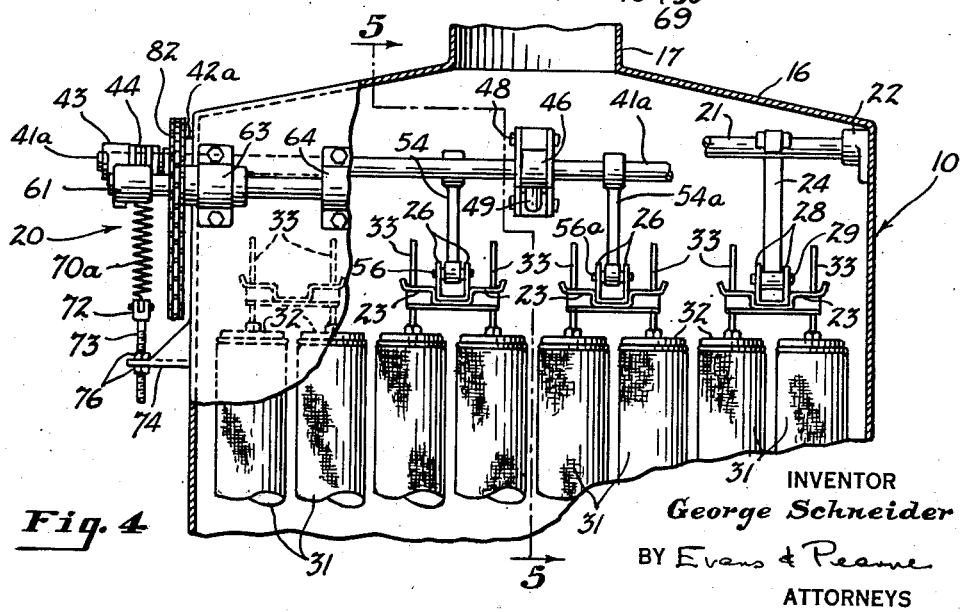

April 15, 1958

G. SCHNEIDER 2,830,676

SHAKER MECHANISM FOR FILTER BAGS

Filed Jan. 19, 1956

INVENTOR
*George Schneider*

BY Evans & Pearne

ATTORNEYS

April 15, 1958  G. SCHNEIDER  2,830,676
SHAKER MECHANISM FOR FILTER BAGS
Filed Jan. 19, 1956  4 Sheets-Sheet 4
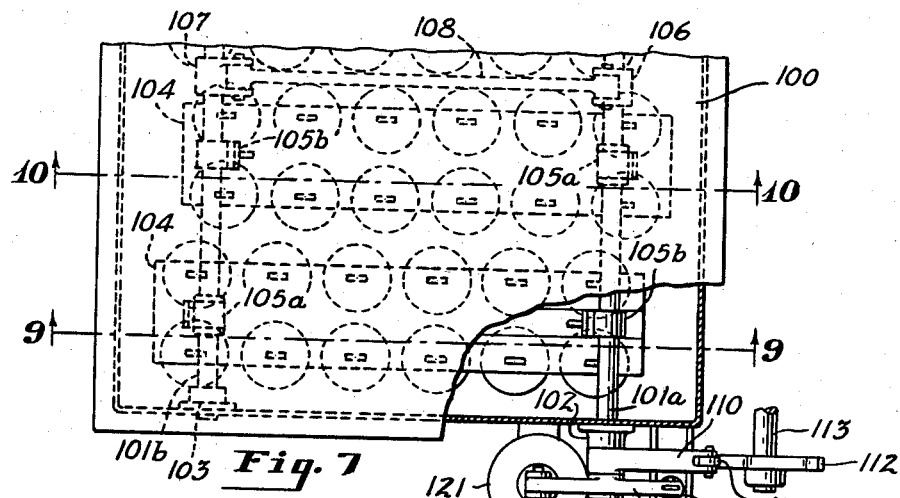
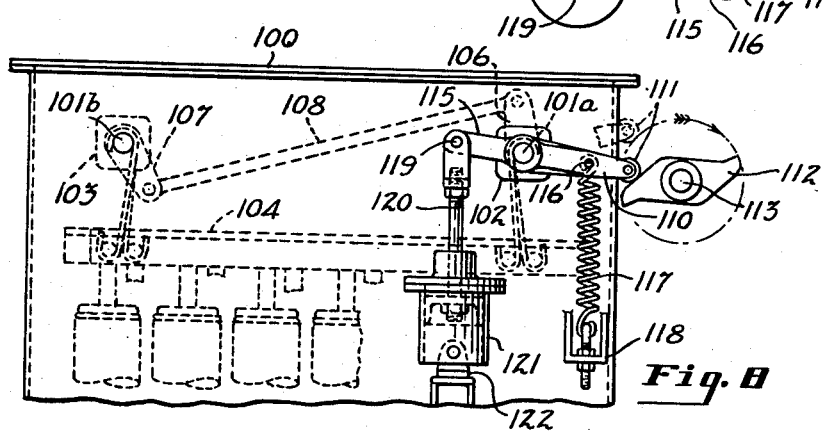
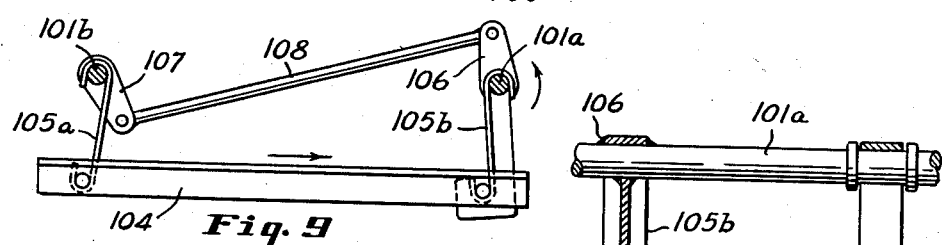
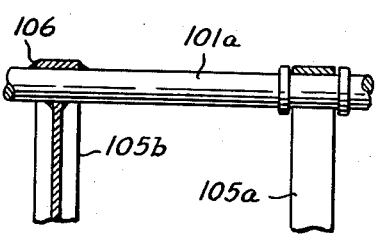
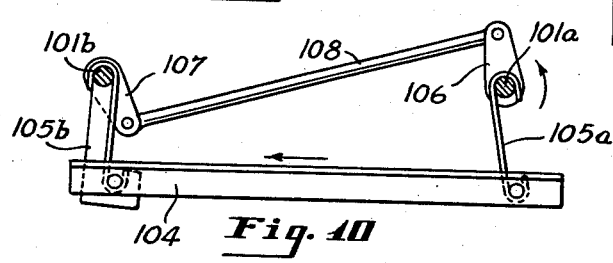
INVENTOR
*George Schneider*
BY Evans & Pearne
ATTORNEYS United States Patent Office 2,830,676
Patented Apr. 15, 1958

2,830,676

SHAKER MECHANISM FOR FILTER BAGS

George Schneider, University Heights, Ohio, assignor to Dracco Corporation, Cleveland, Ohio, a corporation of Ohio Application January 19, 1956, Serial No. 560,172

7 Claims. (Cl. 183—53)

This invention relates to shaking mechanisms for the filter bags of dust collectors, and particularly to such mechanisms in which the filter bags are made of woven glass fibers or the like, which are relatively fragile and tend to break if subjected to certain kinds of flexing while being shaken to remove accumulated dust therefrom.

The general type of dust collectors to which the invention relates is broadly old and has been widely used in industry. It includes a chamber having a series of elongated, tubular, porous, filter elements or "bags" suspended therein, the bags being closed at their upper ends and open at their lower ends, which are held in fixed positions. Dust laden gases are piped into the chamber and pass into the fixed, lower, open ends of the bags. The gases penetrate the walls of the bags and are exhausted from the chamber to the atmosphere or to a gas recovery system, while the dust is held back by the bag walls and accumulates in the pores or interstices between the threads from which the bags are woven. After a period of use, the bag walls become so loaded with accumulated dust that the filtering operation must be stopped so that the bags may be cleaned. This is customarily done by having the upper closed ends of the bags suspended from a movable support which can be oscillated or vibrated to shake the bags and discharge the dust from the lower end thereof without removing the bags from the dust collecting chamber. Generally, a plurality of complete dust collecting units is provided so that one unit may be in service while another is shut down for cleaning.

For many years, the dust filter bags used for apparatus of the character described were woven from various kinds of fibers which would adequately withstand the shaking action necessary for cleaning the bags. However, their ability to withstand the high temperatures and chemical action of many industrial gases was limited, and, to render the bags more durable in this respect, they have more recently been made of woven glass fibers. This created a new problem because the glass fiber bags were more easily damaged by the shaking action employed to clean them. If the glass fiber bags were shaken by moving the upper ends of the bags in the direction of the longitudinal axis of the bags, the resultant stretching and release of tension caused rapid breaking of the glass fibers and destruction of the bags. If these bags were shaken laterally sufficiently to cause a substantial bending of any portions of the bags, the same rapid bag failures occurred. To the best of my knowledge, all of the prior bag shaking mechanisms have been unsatisfactory when used with these glass fiber bags, either because they caused too rapid destruction of the bags or because the shaking action was too mild to clean the bags effectively.

The principal object of this invention is to provide a bag shaking mechanism for apparatus of the kind referred to which will effectively and quickly clean woven glass fiber bags without damaging them by excessive bending or stretching of the glass fibers.

Other objects of the invention are to accomplish the foregoing objective in a simple and inexpensive manner.

The objectives are accomplished in accordance with the invention by suspending the upper ends of a row of filter bags from a common support mounted for free reciprocation along a predetermined path, as has heretofore been common in the art, and by combining therewith a novel mechanism for reciprocating said support with a different kind of motion than has previously been employed, whereby a rapid and violent shaking movement of relatively small amplitude is imparted to the upper ends of the filter bags.

The mechanism for reciprocating the bag support and shaking the bags comprises apparatus for applying a force to move the support a short distance in one direction along its path of travel from a normal rest position, against the action of a spring or the like, and for rapidly removing that force, and snubbing or damping means, such as an oppositely acting spring, a dashpot, or the like, for quickly snubbing return movement of the support to impart a sudden, sharp, transverse jolt to the upper ends of the bags. According to the preferred and simplest form of the invention, the spring opposing initial movement of the bag support and the snubbing or damping means may comprise a pair of relatively stiff, opposed springs operatively connected to the support, one of the springs being biased to oppose movement of the support in one direction from its normal rest position and the other being biased to oppose movement of the support in the opposite direction. When the force is applied to the support to move it a short distance in one direction from its normal rest position, and this force is then suddenly removed, the combined action of the two springs causes the support to be moved rapidly back in the opposite direction by one spring and to be snubbed to a halt by the other spring. By proper adjustment of the two springs, an abrupt snubbing action results. This effectively shakes accumulated dust from the bags without moving the upper ends of the bags for enough to appreciably stretch or bend the glass fibers of the bag fabric. Therefore, the shaking action in no way damages the glass fibers, as has occurred with prior shaking mechanisms, and deterioration of the bags from such cause is virtually completely eliminated. As indicated above, a dashpot or the like may be substituted for one of the springs to serve as the snubbing means opposing the other spring.

The foregoing objects, features, and advantages of the invention will be more fully understood from the following detailed description of illustrative embodiments thereof, and from the accompanying drawings in which:

Figure 3 is a further enlarged plan view of the same apparatus, with parts broken away for clarity of illustration.

Figure 4 is a fragmentary side elevation on the scale of Figure 3, and partly in section, showing further details of the same apparatus.

Figure 7 is a fragmentary plan view, similar to Figure 3, of a dust collecting device to which is applied a modified form of the invention, using a dashpot as a snubbing means.

Figure 8 is a fragmentary end elevation of the apparatus of Figure 7.

Figures 9 and 10 are similar end elevations of two adjacent dust bag supports in the apparatus of Figures 7 and 8, showing how they are mounted for opposite reciprocation, the views being respectively taken as indicated by the lines 9—9 and 10—10 in Figure 7.

Figure 11 is a side elevation, partly in section, showing how two adjacent dust bag supporting straps of Figures 9 and 10 are mounted on the oscillating shaft through which the movement of the bag supports is controlled.

Figures 1, 2:
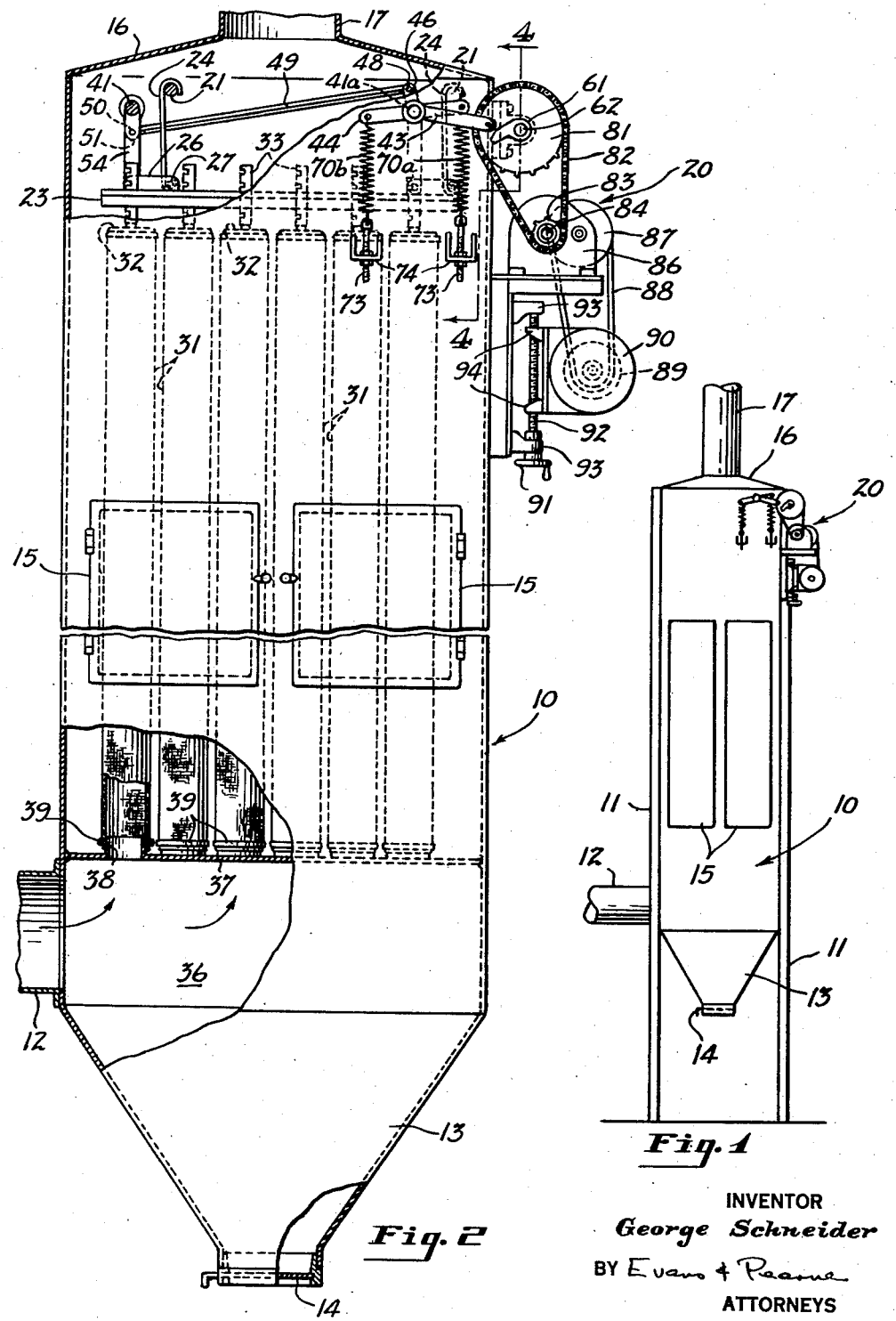
Figure 1 is an end elevation of a complete dust collecting device to which the invention is applied.
Figure 2 is an enlarged end elevation showing a portion of the apparatus of Figure 1 in greater detail, with parts broken away for clarity of illustration.

Referring first to Figure 1 of the drawings, a conventional large dust collector housing 10 for receiving dust laden gases is shown supported by framework legs 11. The housing 10 has an inlet conduit 12 communicating therewith adjacent the lower end thereof for feeding dust laden gases into the housing, a hopper-shaped bottom 13 with a slidable bottom closure plate 14, a pair of doors 15 for access to the interior of the housing 10, and a slightly domed top wall 16 leading to a gas outlet flue 17. Actuating mechanism for shaking filter bags in accordance with the invention, generally designated 20, is mounted adjacent the top of the housing 10 and is disposed partly outside and partly inside the housing.

Referring next to Figures 2, 3, 4, and 5, a pair of heavy (non-rotating) shafts 21 extend horizontally from end-to-end of the housing 10 and are supported from the end walls of the housing by any suitable brackets 22. Any desired number of double-channeled, movable beams 23 (four being shown in this instance) extend horizontally below and transversely with respect to the shafts 21, these beams having their opposite ends spaced from the adjacent side walls of the housing 10 to permit small amplitude, longitudinal reciprocating movement of the beams. Each beam 23 may be suspended from the shafts 21 by a pair of supporting straps 24, or the like, each strap being secured at its upper end to one of the shafts 21 for pivotally swinging thereon, and being pivotally connected at its lower end to one of the beams 23 by a bracket 26 and bearing pins 27 or by a somewhat simpler bracket 28 and bearing pin 29 (the bracket 26 performing a dual function as will appear below). Thus, each beam 23 (independently of the others) may reciprocate longitudinally while being swingably supported by the straps 24 from the fixed shafts 21. Alternatively, the beams 23 may be supported at intervals on rollers (not shown) for true rectilinear reciprocation or may be supported by or on any other form of linkage or carriage permitting them to be reciprocated along a relatively short, substantially rectilinear path. For greater dynamic balance, half of the beams 23 may be moved in one direction, while the other half of the beams are moved in the opposite direction, as more fully explained below.

Two rows of dust filter bags 31, having their upper ends secured to and closed by supporting cap plates 32, are suspended from each beam 23, one row being suspended from spaced points along one side of the beam and the other row from spaced points along the other side of the beam. Each of the cap plates 32 has a bar 33 rigidly attached thereto and extending vertically through an aperture in the beam 23 immediately above the cap plate. Each bar 33 is rigidly, but removably, anchored to the beam 23 through which it passes and is vertically adjustable with respect to its beam 23, by any suitable attaching mechanism (not shown in detail). The bars 33 may be notched at intervals along their lengths, as shown, for engagement by a suitable locking plate (not shown) forming a part of the attaching mechanism. The particular type of attaching mechanism for the bars 33 is a matter of choice in mechanical design and does not per se constitute a part of the invention claimed herein, and the details thereof have been omitted for simplicity.

Referring particularly to Figure 2, each dust filter bag 31 has an open lower end secured in fixed position in communication with the inlet conduit 12 through a chamber 36 in the bottom of the housing 10. The chamber 36 is closed from the upper part of the housing 10 by a rigid baffle 37 having a flanged opening 38 for each filter bag 31. The open lower end of each filter bag 31 may simply be slipped around the flange of each opening 38 and held in place thereon by a clamping ring 39, or the like. The chamber 36 serves both as a settling chamber for heavier dust particles and as a hopper to receive dust that is shaken out of the filter bags from time to time, all of which dust may be discharged by gravity from the throat of the hopper, as desired, by sliding out the closure plate 14.

The actuating mechanism 20 for reciprocating the filter bag supporting beams 23 and shaking the bags 31 includes a second pair of heavy shafts 41 and 41a that extend horizontally from end-to-end of the housing 10 and are rotatably supported from the end walls of the housing by suitable bearings 42 and 42a (Figure 3). One end of the shaft 41a projects through one end wall of the housing 10 and through the bearing 42a at this location in driving relationship with the part of the mechanism disposed outside the housing (described below).

A crank 43 is mounted outside the housing 10 on the outwardly projecting end of the shaft 41a in driving relationship therewith for applying torque in one direction to this shaft. A double-ended lever 44 is also mounted intermediate its ends on the outwardly projecting end of the shaft 41a in driving relationship therewith for applying torque in both directions to this shaft. The function of the crank 43 and lever 44 in causing oscillation of the shaft 41a, and the mechanism for actuating both the crank and the lever are also mounted outside the housing 10 and are described below.

Inside the housing 10 (Figure 5), a short crank 46 is mounted on the shaft 41a in driven relationship therewith midway between the ends of the housing. The arm of the crank 46 projects generally upwardly and has a bifurcated upper end that is pivotally connected at 48 to one end of an inclined, transverse coupling link 49. The opposite end of the coupling link 49 is pivotally connected at 50 to a short crank 51 that is mounted on the rotatable shaft 41 in driving relationship therewith. The spacing of the shaft 41 from the connection 50 and the spacing of the shaft 41a from the connection 48 are substantially the same, so that oscillation of the shaft 41a imparts substantially equal and opposite (i. e., out-of-phase) oscillation to the shaft 41.

Half of the bag supporting beams 23, e. g., alternate ones, are connected to the shaft 41 in driven relationship therewith by a corresponding number of cranks 54, each crank 54 having its upper end rigidly connected to the shaft 41 and having a lower, bifurcated end pivotally embracing a second pin 56 in a bracket 26 mounted on the associated beam 23. The remainder of the beams 23 are similarly connected to the shaft 41a, each by a crank 54a and pin 56a, the latter being mounted in a bracket 26 on the associated beam 23. Thus, when the shafts 41a and 41 are caused to oscillate out-of-phase with each other, all of the beams 23 are reciprocated by their respective driving cranks 54 or 54a, those driven by the shaft 41 moving oppositely (i. e., out-of-phase) with those driven by the shaft 41a.

Outside the housing 10, the actuating mechanism for the parts last described includes a roller 60 mounted on a free end of the crank 43 for intermittent engagement by a cam 61. The cam 61 is mounted on a shaft 62 for continuous rotation therewith, and the shaft 62 is rotatably mounted on the housing 10 by a pair of bearing brackets 63 and 64.

Figure 6:
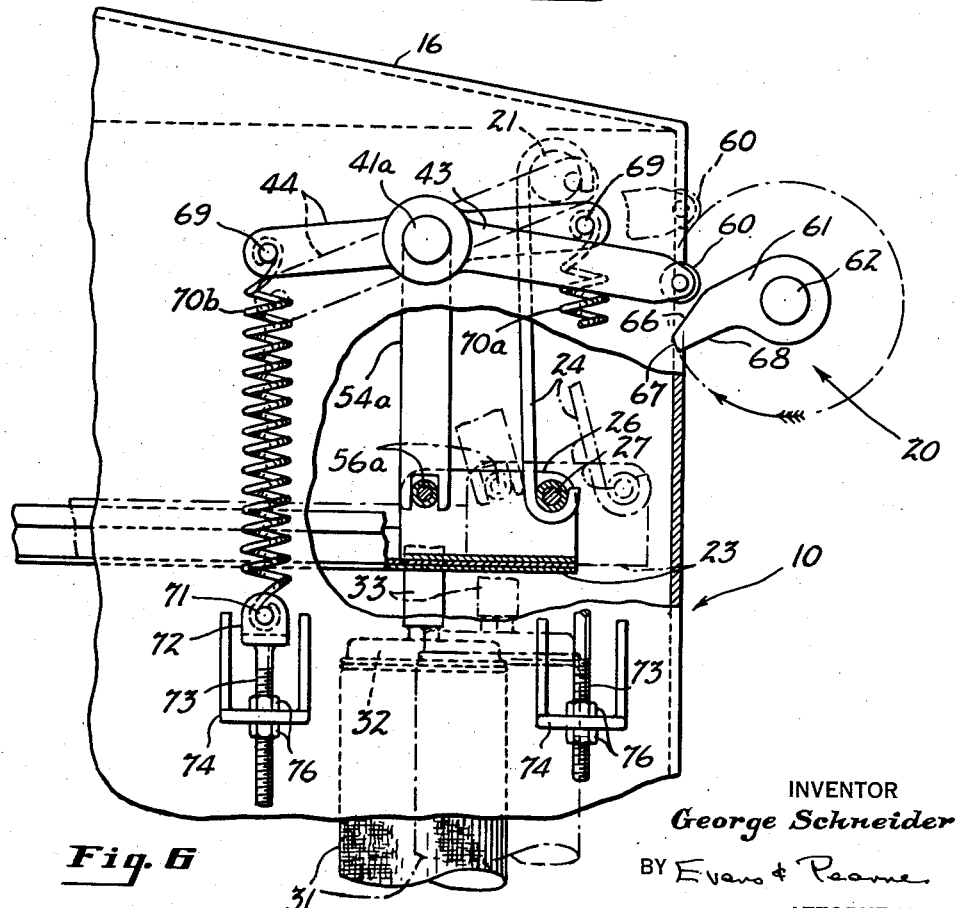
Figure 6 is a still further enlarged, fragmentary end elevation of the same apparatus, showing portions of the structure in Figure 2, in still greater detail.

As best shown in Figure 6, the cam 61 is shaped for intermittent engagement only with the cam roller 60. Rotating clockwise, as indicated by an arrow in Figure 6, a generally flat surface 66 of the cam 61 first engages the roller 60, and the roller rides over this surface to a short circumferential cam surface 67, and then over this surface until it rides past the radial cam edge 68. While the roller 60 is riding along the cam surface 66, the crank 43 and shaft 41a are rotated counterclockwise, as viewed in Figure 6, until the roller rides over the cam surface 66 onto the circumferential cam surface 67. When the roller has ridden over the latter cam surface and passes the radial cam edge 68, the cam is suddenly completely disengaged from and moved out of any possible contact with the roller 61, leaving the crank 43 and shaft 41a free to rotate in the reverse (clockwise) direction.

Also mounted on the shaft 41a for rotation therewith is the lever 44, mentioned above. This lever 44 has a pair of arms that extend in opposite directions from the shaft 41a, terminating in identical bifurcated ends that form yokes for a pair of pins 69. A pair of heavy helical springs 70a and 70b have hook-shaped upper ends that are respectively hooked over the pins 69 on opposite ends of the lever 44. The springs 70a and 70b also have hook-shaped lower ends that are respectively hooked over pins 71 in yokes 72 from which threaded shanks 73 depend. A pair of cantilever arms 74, rigidly mounted on the housing 10 in any desired manner (not shown), project outwardly below the springs 70a and 70b, respectively. The springs 70a and 70b are held under tension by the shanks 73, which respectively pass through the cantilever arms 74, the tension being adjustably maintained by a pair of nuts 76 on each shank.

Figure 5:
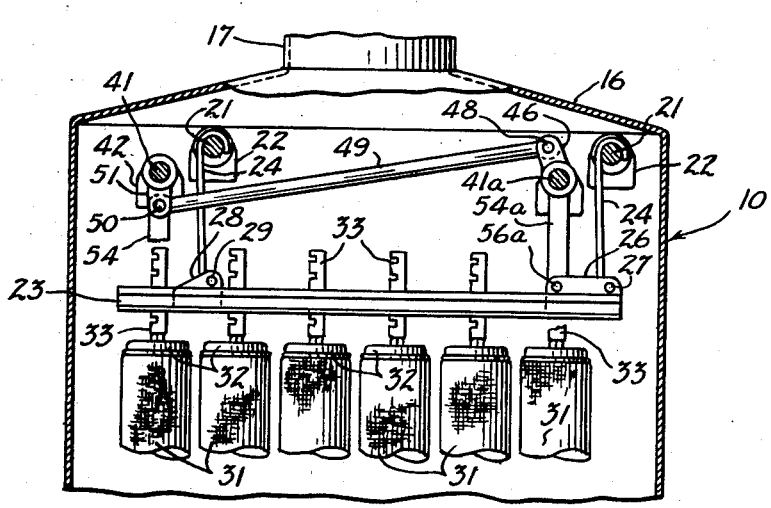
Figure 5 is a fragmentary vertical section of the same apparatus, taken as indicated by the line 5—5 in Figure 4.

From the foregoing, it will be appreciated that the springs 70a and 70b oppose each other in restraining rotation of the shaft 41a in either direction from a normal rest position. This position may be that in which the cranks 54 and 54a, spaced along the shafts 41 and 41a, respectively, are holding the filter bags 31 with their axes all substantially vertical (Figures 2, 5, and 6). Obviously, this requires that the tension in the two springs be approximately the same when the cranks 54 and beams 23 are in their normal rest positions, in order for the mechanism to be in static equilibrium under such a condition. The resistance of the springs to deformation should be such that they are both under very substantial tension when this static equilibrium exists. The amount that the spring 70a is deformed when this static equilibrium exists is not of particular importance, since substantial slackening of this spring from its static equilibrium condition should not normally occur. However, the amount that the snubbing spring 70b is deformed under static equilibrium conditions should be sufficient so that this spring is not relieved of all tension when the shaft 41a has been rotated by the cam 61 to rotate the lever 44 to the extreme position shown in phantom outline in Figure 6. In other words, the snubbing spring 70b should not become slack when the lever 44 is in its extreme position.

As the cam 61 is forcing the crank 43 and shaft 41a and lever 44 to rotate counterclockwise to the positions shown in phantom outline in Figure 6, this rotation is strongly opposed by the increased tension in the right hand spring 70a and is assisted to a lesser degree by the other spring 70b, the tension of which is reduced. The resultant of the spring-developed torques applied to the shaft 41a during such rotation strongly opposes the rotation and increases from zero to a maximum throughout such rotation.

When the cam 61 is suddenly disengaged from the roller 60, this resultant torque acts to rotate the shaft 41a rapidly in the reverse, i. e., clockwise, direction, as viewed in Figure 6. The resultant clockwise torque exerted by the springs 70a and 70b decreases to zero as the parts approach their normal rest positions. However, the momentum of the shaft 41a and of all the relatively massive parts driven thereby causes these parts to rotate in the latter direction somewhat beyond the above described normal rest position, thus building up a counterclockwise resultant torque in the spring system. This counterclockwise resultant torque snubs the clockwise rotation of the shaft 41a.

By employing very heavy springs 70a and 70b, adjusted to have a high minimum tension and, consequently, a still greater maximum tension, the snubbing effect on the rotation of the shaft 41a can be made as abrupt as desired in order to impart a sudden jar to the filter bags for freeing them of adherent dust.

As is apparent from the small angle of rotation of the cam 61 during which it is in engagement with the roller 60, the maximum amplitude of rotation of the shaft 41a is also small. This movement is transmitted from the shaft 41a through the cranks 54a to half of the beams 23, and through the crank 46, link 49, crank 51, shaft 41, and crank 54 to the other half of the beams 23, the two sets of these beams being reciprocated out-of-phase with each other, as described above. While each point on each of the beams 23 actually moves back and forth along an arc having a radius determined by the lengths of the supporting straps 24, the length of the path of such movement is also very small (being limited by the above described small amplitude of oscillation of the shaft 41a). As a result, the beams 23 have a negligible rise and fall and a short distance of horizontal travel. Therefore, the corresponding movement imparted to the upper ends of the filter bags 31 through the bars 33 and cap plates 32 is essentially horizontal along a short path so that virtually no stretching or bending of the bags occurs. At the moment the snubbing action occurs, the movement of the upper ends of the filter bags is abruptly stopped, thus setting up a violent horizontal vibration that travels along the entire lengths of the bags from top to bottom and effectively shakes loose the accumulated dust.

There remains to be described only the mechanism for rotating the shaft 62 and cam 61 of the apparatus of Figures 1–6. This mechanism may be very simple and may comprise a sprocket 81 on the shaft 62, connected by a driving chain 82 to a small driving sprocket 83 on an output shaft 84 of a suitable speed reducing gear box 86. The gear box 86 may have a pulley 87 on its input shaft connected by a driving belt 88 to a pulley 89 on the drive shaft of an electric motor 90. As shown in Figure 2, the tension in the driving belt 88 may be adjusted in a conventional manner by a hand crank 91 suitably geared (not shown) to drive a pair of vertical screws 92 (only one being shown—Figure 2) that turn in a pair of brackets 93 mounted on the housing 10, the screws 92 being threaded through a pair of bosses 94 on the housing of the motor 90.

It is desired that the cam 61 remain completely disengaged from the roller 60 from the time it releases the shaft 41a at least until the bags and bag supporting structure have come completely to rest. The time for this to occur will depend upon many design details of the apparatus, such as the mass of the moving parts, and can be adjusted within limits by adjusting the tension in the springs 70. The speed reduction ratio between the motor 90 and the cam shaft 62 (involving a reduction in the pulley drive and the chain drive, as well as in the intermediate gear box 86) should be at least sufficient so that the cam 61 will remain disengaged from the roller 60 for the desired period.

Except as it will cause a greater time delay and prolong the operation of removing accumulated dust from the filter bags 31, it is immaterial that a still greater speed reduction may be employed, or that the cam 61 may move very slowly over the roller 60 and initiate the oscillation of the connected mechanism with a slow and gradual initial movement of the lever 43. No reliance is placed upon this initial movement per se to shake dust from the filter bags. The effective shaking for this purpose occurs only during and for an instant following the snubbing action that brings the movement of the bag supporting mechanism to an abrupt halt. Thus, any time delay before another oscillation cycle is initiated has no bearing on the effectiveness of any one cycle.

The mode of operation of the particular embodiment of the invention illustrated and described herein will be apparent from the foregoing detailed description of the cooperative relationship of the various parts of the mechanism. All that is required to place the mechanism in operation, after the springs 70a and 70b have been tensioned to the proper degree, is to energize the motor 90 and let the mechanism operate until the removal of dust from the filter bags has been accomplished. The motor 90 is then stopped, and, after all loose dust in the housing 10 has settled, the accumulation of dust in the hopper portion 13 is discharged by opening the bottom of the hopper, as previously described.

Turning now to the apparatus illustrated in Figures 7 to 11, a main housing 100 may be essentially the same as in the first described apparatus and may be mounted on a supporting framework (not shown) in the same manner as shown in Figure 1. The actuating mechanism for shaking the bags is again mounted partly outside and partly inside the housing, but is of somewhat different design in certain aspects, as will be explained.

A pair of heavy rotating shafts 101a and 101b extend horizontally from end-to-end of the housing 101 and are rotatably supported at their ends by suitable bearings, such as 102 and 103, carried by the housing. Any desired number of movable bag supporting beams 104 (only two being shown) extend horizontally below and transversely with respect to the shafts 101a and 101b in the same general relationship as in the apparatus of Figures 1–6.

Each beam 104 is suspended from the shafts 101a and 101b by a pair of supporting straps 105a and 105b (Figures 9 and 10), each strap being secured at its upper end to one of the two shafts, the straps 105a being rotatably hung thereon, and the straps 105b being fixed thereto against relative rotation, as by welding at 106 (Figure 11). One of the beams 104 (Figure 9) is hung from the shaft 101a by one strap 105b fixed thereto for rotation therewith and to the shaft 101b by a second strap 105a freely rotatable on that shaft. The adjacent beam 104 (Figure 10) is similarly hung, but with one strap 105b fixed to the shaft 101b for rotation therewith and the other strap 105a freely rotatable on the shaft 101a. Thus, oscillation of the shaft 101a causes one beam 104 (Figure 9) to reciprocate, and oscillation of the shaft 101b causes the adjacent beam 104 (Figure 10) to reciprocate. The straps 105b are more rigidly constructed than the straps 105a, as shown, for transmitting driving forces to the beams 104.

The two shafts 101a and 101b are connected for opposite or out-of-phase oscillation by a pair of cranks 106 and 107 and a transverse connecting link 108 (Figures 8, 9 and 10). Thus, oscillation of shaft 101a will cause opposite or out-of-phase reciprocation of a pair of adjacent bag supporting beams 104 in the same general manner as in the apparatus of Figures 1–6.

Such oscillation of the shafts 101a and 101b and reciprocation of the beams 104 is effected by extending the shaft 101a through the housing 100 (Figure 7) where its projecting end carries a cam engaging crank 110. This crank carries a cam roller 111 on its free end for intermittent actuation by a cam 112 in the same manner as in the apparatus of Figures 1–6. The cam 112 is mounted on a shaft 113 which may be continuously rotated by the same external motor and drive mechanism of Figures 2 and 3 (not again shown in Figures 7 and 8).

As will be appreciated, the above described mechanism of Figures 7 to 11 is equivalent to, but considerably simpler than, the corresponding mechanism of the apparatus of Figures 1–6.

The mechanism for oscillating the shafts 101a and 101b also includes a double-ended lever 115 mounted externally of the housing 100 on the projecting end of the shaft 101a. One end of this lever is bifurcated and provided with a pin 116, over which the upper end of a helical spring 117 is hooked. The lower end of the spring 117 is adjustably held by a bracket 118 for applying a desired tension to the spring, in the same manner and for the same purpose as in the case of the spring 70a of the apparatus of Figures 1–6.

The opposite end of the double-ended lever 115 is pivotally connected at 119 to the plunger 120 of a dashpot 121, which is pivotally mounted on the housing 100 by a bracket 122, so as to accommodate the linear travel of the dashpot plunger to the arcuate travel of the connected end of the lever 115. The dashpot 121 may be of any conventional design for permitting free downward movement of the plunger 120 and for snubbing upward movement thereof shortly before reaching the upper limit of its path of travel. Such action of a dashpot is sufficiently well known to require no more detailed description, and the illustration thereof in Figure 8 has been made quite diagramamtic for simplicity.

Essentially, the overall operation of the apparatus of Figures 7–11 is the same as that of the apparatus of Figures 1–6, except that the dashpot 121 is substituted for the snubbing spring 70b. Thus, initial counterclockwise rotation of the shaft 101a is opposed by the spring 117, but is not assisted by the dashpot 121. After disengagement of the cam 112 from the roller 111, clockwise rotation of the shaft 101a is caused and influenced only by the tension in the single spring 117 until the snubbing action of the dashpot occurs at the point in the reverse path of movement of the parts at which the dashpot is set to function in that manner. However, the overall effect of the spring 117 and dashpot 102 in accelerating and then abruptly snubbing the bag shaking movement of the various moving parts is essentially the same as the effect of the opposed springs 70a and 70b in the apparatus of Figures 1–6. Consequently, essentially the same effective bag shaking action results without destructive stretching or transverse bending of the bags.

From the foregoing description of preferred embodiments of the invention, it will be appreciated that it will accomplish the several objects of the invention efficiently and effectively. The ability of glass fiber filter bags to withstand the violent, but small amplitude, vibrations imparted to them has been amply and conclusively demonstrated by continuous shaking at the rate of about 2 cycles of the actuating cam per minute, 24 hours a day, for several weeks without any detectable filter bag damage. By contrast, prior mechanisms which substantially stretch the bags longitudinally, or bend them by reciprocating their upper ends horizontally over longer paths of travel, or a combination of both, cause rapid bag deterioration and breakage. Moreover, the violence of the shaking obtainable by positive mechanical drives or by the action of springs acting in one direction only is much lower than that obtainable by the present invention and is far less effective in removing dust from the bags.

While the present invention has been illustrated herein by reference to the detailed construction of specific machines, it will also be appreciated that such details may be changed in numerous respects without departing from the true spirit and scope of the invention as defined in the appended claims. Accordingly, the invention is not to be limited to any of the particular mechanical parts and movements herein described, except as required by the terms of the appended claims.

Having described my invention, I claim:

1. In a dust collecting apparatus including elongated dust filter elements disposed in side-by-side relationship with their longitudinal axes substantially parallel, corresponding ends thereof fixed to a stationary base, and their opposite ends connected to a common relatively movable support for shaking said elements; the improvement comprising means mounting said support for free reciprocation along a predetermined, substantially rectilinear path extending substantially transversely to the longitudinal axes of said elements, power actuated means for intermittently engaging and moving said support a short distance in one direction along said path from a normal rest position and then disengaging it to permit reverse movement thereof along said path, a spring operatively connected to said support and adjustably biased to resist movement thereof in said one direction and cause rapid reverse movement thereof when disengaged by said power means, and a snubbing means operatively connected to said support for interrupting said reverse movement thereof relatively abruptly upon its return to adjacent said rest position for imparting vibration to the adjacent ends of said elements connected thereto, which vibrations are essentially transverse to the longitudinal axes of the elements.

2. In a dust collecting apparatus including elongated, flexible, dust filtering elements disposed in side-by-side relationship with their longitudinal axes substantially vertical, corresponding ends thereof fixed to a stationary base, and their opposite ends connected to a common, relatively movable member for shaking said elements; the improvement comprising means mounting said movable member for free reciprocation along a predetermined, substantially horizontal path substantially transverse relative to the longitudinal axes of said elements, power actuated means for intermittently engaging and moving said movable member a short distance in one direction along said path and then disengaging it to permit reverse movement thereof along said path, a spring operatively connected to said movable member and adjustably biased to resist movement thereof in said one direction and cause rapid reverse movement thereof when disengaged by said power means, and a snubbing means operatively connected to said movable member for interrupting said reverse movement thereof relatively abruptly, after rapid reverse movement has been imparted thereto, for causing essentially transverse vibration only of said elements.

3. The improvement of claim 2 in which the distance said movable member is moved along said path is sufficiently small relative to the length of said elements to cause substantially no stretching of said elements.

4. In a dust collecting apparatus including vertically elongated, flexible, dust filter bags disposed in side-by-side relationship and having closed upper ends and open lower ends, corresponding ends of said bags being fixed to a stationary base and their opposite ends being connected to a common, relatively movable member for shaking said bags; the improvement comprising means mounting said movable member for free reciprocation along a predetermined, substantially horizontal path substantially transverse relative to the longitudinal axes of said bags, power actuated means for intermittently engaging and moving said movable member a short distance in one direction along said path and then disengaging it to permit reverse movement thereof along said path, a spring operatively connected to said movable member and adjustably biased to resist movement thereof in said one direction and cause rapid reverse movement thereof when disengaged by said power means, and a snubbing means operatively connected to said movable member for interrupting said reverse movement thereof relatively abruptly, after rapid reverse movement has been imparted thereto, for causing essentially transverse vibration only of said bags.

5. The improvement of claim 4 in which the distance said movable member is moved along said path is sufficiently small relative to the length of said bags to cause substantially no stretching of said bags.

6. In a dust collecting apparatus including vertically elongated, flexible, dust filter bags disposed in side-by-side relationship and having closed upper ends and open lower ends immovably coupled to and in communication with open upper ends of stationary vertical conduits fixed to a stationary base, the upper closed ends of said bags being connected to a common, relatively movable member for shaking said bags; the improvement comprising means mounting said movable member for free reciprocation along a predetermined, substantially horizontal path substantially transverse relative to the longitudinal axes of said bags, power actuated means for intermittently engaging and moving said movable member a short distance in one direction along said path and then disengaging it to permit reverse movement thereof along said path, a spring operatively connected to said movable member and adjustably biased to resist movement thereof in said one direction and cause rapid reverse movement thereof when disengaged by said power means, and a snubbing means operatively connected to said movable member for interrupting said reverse movement thereof relatively abruptly, after rapid reverse movement has been imparted thereto, for causing essentially transverse vibration only of said bags.

7. The improvement of claim 6 in which the distance said movable member is moved along said path is sufficiently small relative to the length of said bags to cause substantially no stretching of said bags or bending thereof due to the immovable coupling of the lower ends of the bags to said stationary vertical conduits.

References Cited in the file of this patent

FOREIGN PATENTS

| | | |
|---|---|---|
| 164,001 | Germany | Oct. 20, 1905 |
| 169,361 | Germany | Apr. 3, 1906 |
| 502,483 | Germany | July 11, 1930 |